United States Patent Office 3,319,804
Patented May 16, 1967

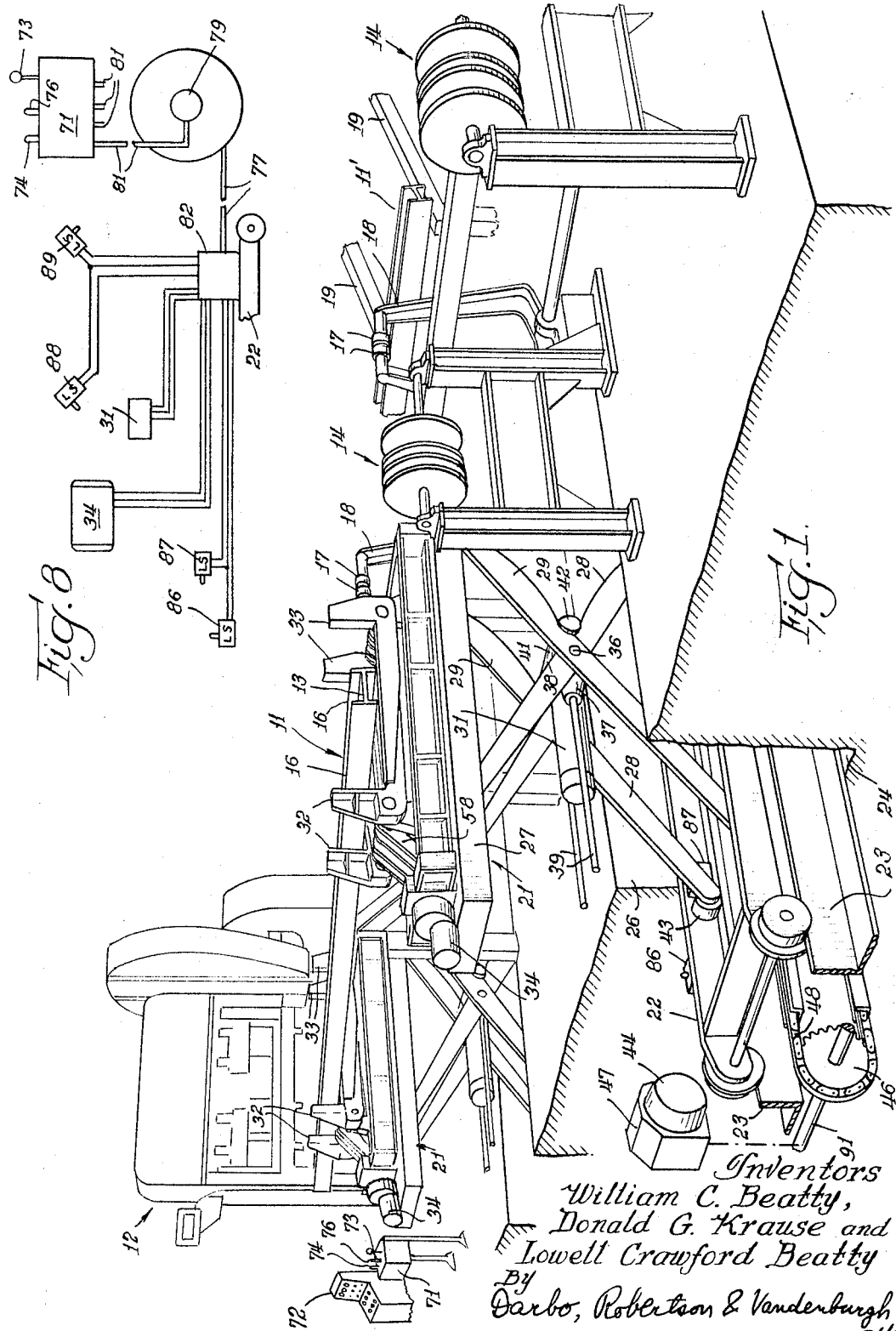

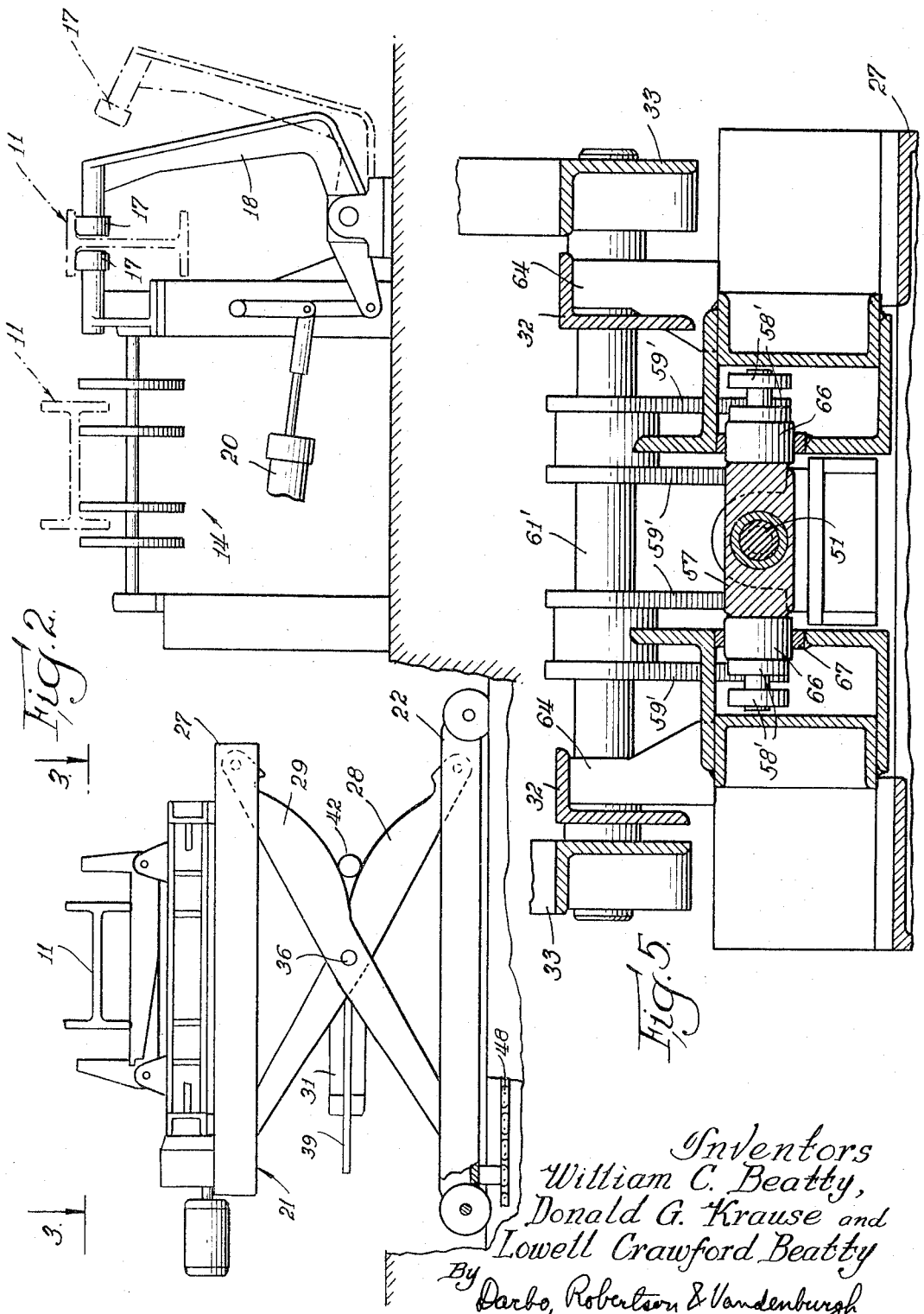

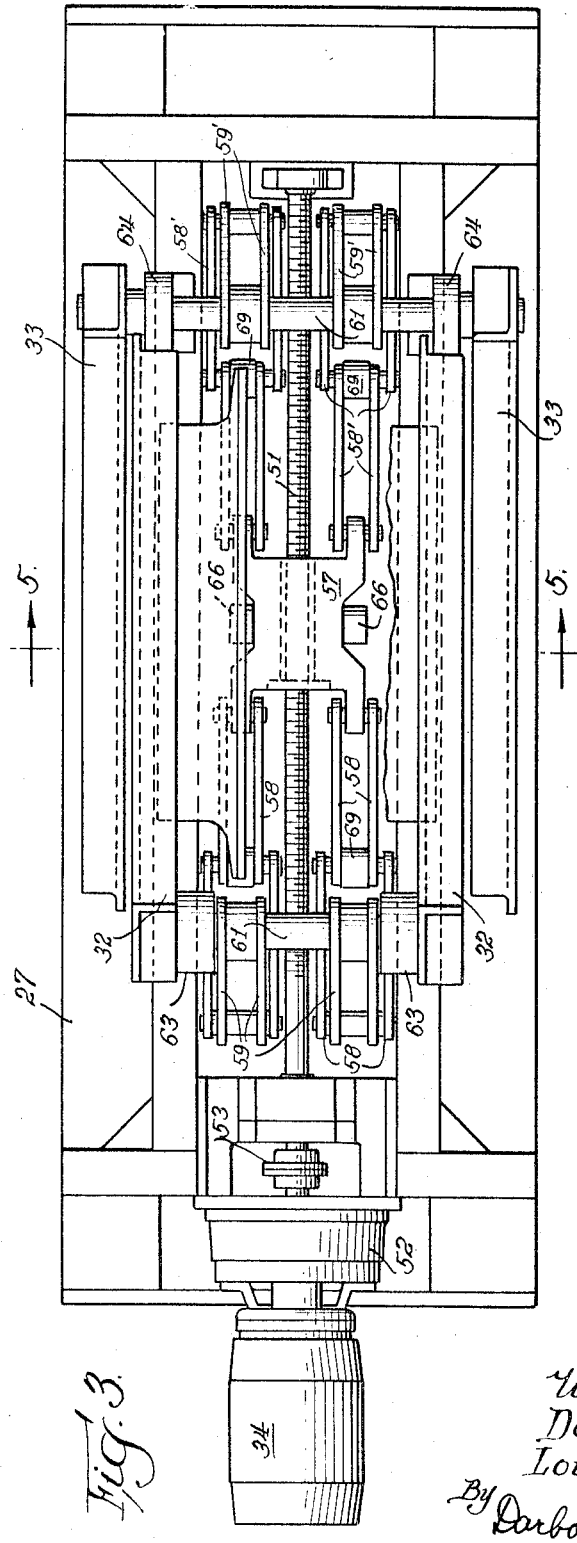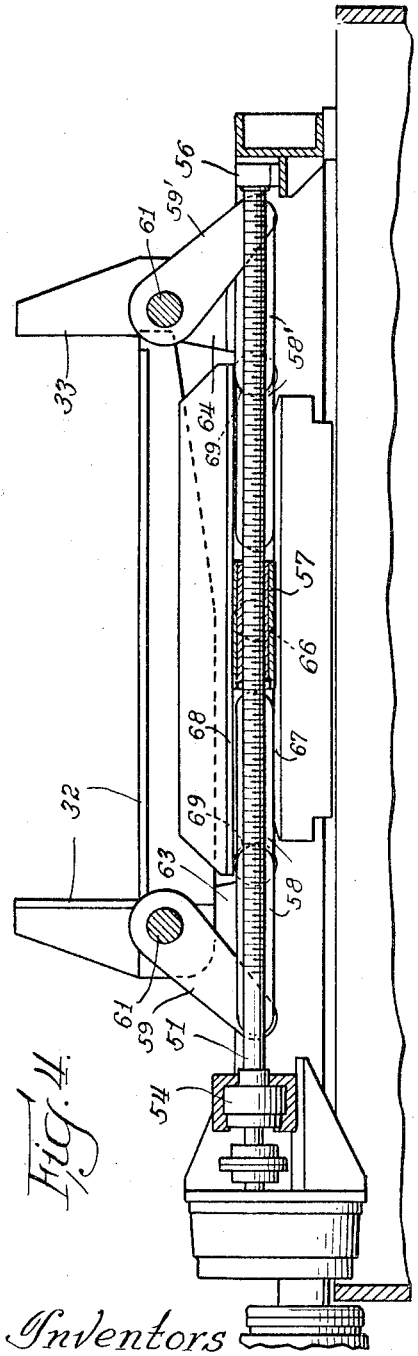

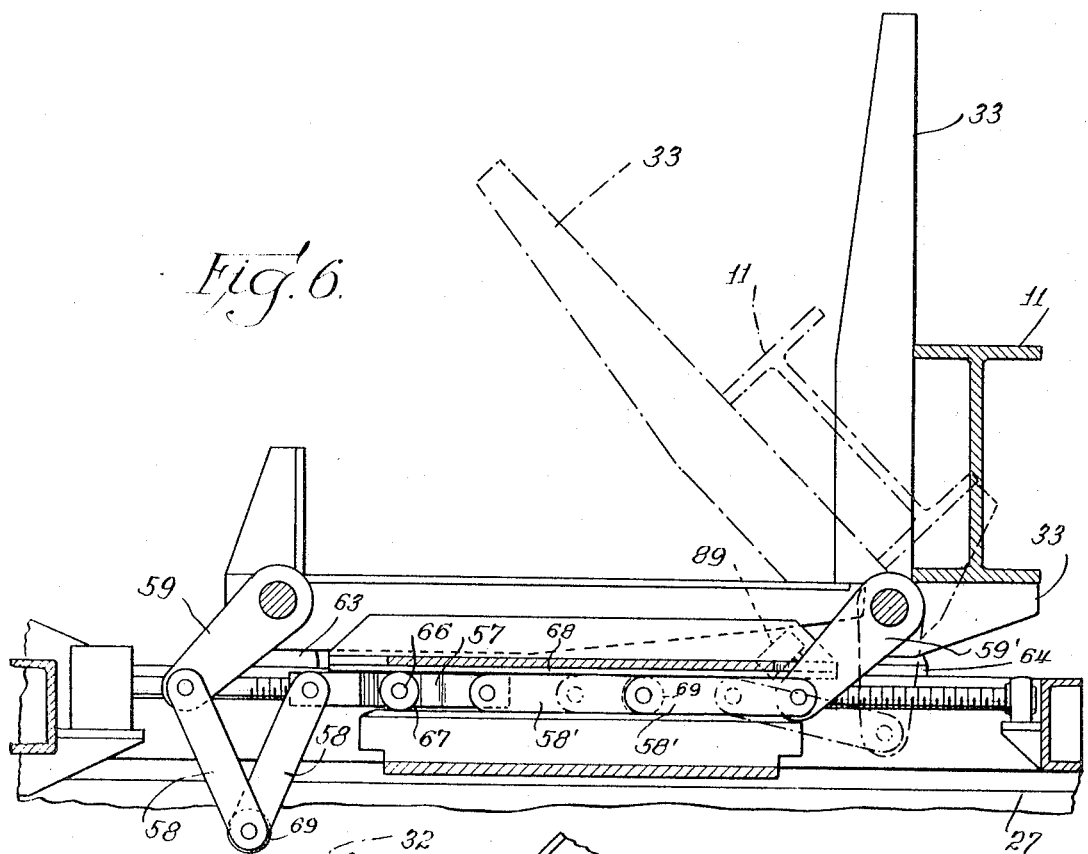

3,319,804
BEAM HANDLING APPARATUS
William C. Beatty, Munster, Ind., Donald G. Krause, Calumet City, Ill., and Lowell C. Beatty, Munster, Ind., assignors to Beatty Machine & Manufacturing Company, Hammond, Ind., a corporation of Indiana
Filed Jan. 21, 1965, Ser. No. 426,997
10 Claims. (Cl. 214—1)

This invention relates to apparatus for handling heavy structural beams, including the turning of the beams to position different sides thereof uppermost for presentation to a beam punch, and this disclosure is offered for public dissemination in the event that adequate patent protection is granted.

The present invention finds perhaps its greatest utility in connection with the Beatty spacing table of Patent 2,452,285, Oct. 26, 1948. That spacing table has been extremely successful and satisfactory for moving steel I beams through a beam punch (a heavy duty powered punch press) with either the flanges or the web positioned horizontally to be punched by that press. Quite often it is necessary to move the same beam through the punch press in three different positions: with the web horizontal, and with first one and then the other flange face positioned at the top of the beam, horizontally. The turning of the beams between these three positions has continued to present a difficult problem throughout the many years this spacing table has been used, and even before.

The spacing table does not have a continuous top surface, but has spaced sets of rollers which support the beam, and move it longitudinally to the different punching positions in the punch press. According to the present invention, turning apparatus is added to cooperate with the spacing table, the turning apparatus including a plurality of like units, mobile to be located in the spacing table line, but interspersed with the spacing table roller sets. There would usually be more than the two illustrated; enough, and so located as to handle the variety of beam lengths expected. It is important that the different turning units of the apparatus operate substantially in unison. Providing a construction in which this substantial synchronization would be reliable constituted one of the problems of the invention.

Each of the turning units include an elevating table, which is preferably mobile for carrying the beams to the spacing table. At the top of the elevating table are opposed pivoted L frames or cradles, either of which may be swung through 90 degrees. Like functions of all of the units are made substantially simultaneously by powering all of them with electric motors started simultaneously by a common electric circuit. It is thus possible to move the turning units under the beam on a rack, raise the table to lift the beam free of the rack, high enough to move into position over the spacing table, move all of the units to transport the beam over the proper set of wheels on the spacing table, lower the table to rest the beam on the wheel sets of the spacing table; and after one set of punching operations have been performed using the table and its L frames to turn the beam for the next set of punching operations and subsequently for the third set of punching operations. In turning the beam, usually the table will first be elevated to raise the beam free of the spacing table and then one set of L frames will be power-actuated to turn the beam 90 degrees. To turn the beam 180 degrees, it will first be turned 90 degrees by one L frame and then, usually be turned an additional 90 degrees by the opposite L frame.

Additional advantages and objects of the invention will be apparent from the description and from the drawings.

Designation of figures

FIGURE 1 is a perspective view illustrating a punching plant embodying the present invention;
FIGURE 2 is a view looking endwise of a beam showing one of the sets of turning units which is supporting it and is in the course of moving it to the dotted line position of the beam where it would be supported by the spacing table in a position for moving it through the punch press or beam punch;
FIGURES 3 and 4 are respectively plan and sectional views of one of the turning units;
FIGURE 5 is a sectional view taken approximately along the line of 5—5 of FIG. 3;
FIGURES 6 and 7 are diagrammatic views representing the different turning operations of the turning table, FIG. 6 showing operation of the right-hand L frame, and FIG. 7 showing operation of the left-hand L frame;
FIGURE 8 is a simplified wiring diagram showing the motor controls of the invention.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements or combinations in which the inventive concepts are found.

Background description

The general combination resulting from this invention is shown in FIG. 1. The general purpose is to position a beam 11 at the various desired positions in a beam punch or a punch press 12. To punch the web 13 of the beam 11, the beam is to be laid on a series of roller sets 14 which are aligned with a gap through the beam press 12 so that the beam 11 with its web 13 may be run through the beam press and stopped at the various positions where one or more holes are to be punched.

The beam 11 may then be turned 90 degrees about its horizontal axis to place one of its flanges 16 uppermost and in horizontal position. As seen in FIG. 2, rollers 17 are spread apart (dotted lines), the beam is lowered between them, and the rollers 17 moved back to their full line positions. Thus finally the upper flanges rest on the rollers 17. There is a series of sets of such rollers aligned with the gap through the beam press 12. This permits the beam to be moved to the various positions at which the upper flange is to be punched. Thereafter, the beam will be reversed, or turned 180 degrees about its longitudinal axis, and its other flange will be uppermost and rested on rollers 17, so that the beam can be moved to the different positions at which holes are to be punched in this other flange.

In each set of rollers 17 the shiftable roller 17 is carried by arm 18 which is moved to open or closed position by hydraulic or air cylinder 20 to permit the beam to be placed between them.

The roller sets 14 and 17 and their supporting structures comprise a spacing table which is the subject of L. C. Beatty patent, 2,452,285 issued Oct. 26, 1948. Such a structure has been manufactured ever since by the Beatty Machine & Manufacturing Co. of Hammond, Ind., and it need not be described further.

At the completion of the punching of beam 11 it may be set on a transfer rack 19, or perhaps it may be moved in the opposite lateral direction and another beam 11' lifted from the rack and positioned on roller sets 14 or 17 for punching. Heretofore, all of the lifting and turning of the beam has been done by much overhead crane work.

General description of invention

According to the present invention, a mobile elevating and turning table made up of the various units generally designated 21 is added to the spacing table. The separate mobile elevating and turning units 21 operate in unison, and would move into or through successive gaps in the line of roller sets comprising the former spacing table.

Each unit 21 includes a mobile frame 22 running on tracks 23 which may be laid on shelves 24 of a trench 26 formed in the floor on which are mounted the spacing table elements. An elevating frame 27 is raised and lowered by scissor links 28, 29 powered by motor 31. Each elevating frame 27 carries two pivoted L frames, a left turning L frame 32 and a right turning L frame 33. Either of these frames may be operated by a motor 34. As seen in FIG. 6, right turning L frame 33 has been swung to its extreme actuated position, shown in full lines, an intermediate position being shown in broken lines. As seen in FIG. 7, left turning L frame 32 is shown in full lines in an intermediate position, its extreme actuated position being shown in broken lines.

Elevating mechanism

The elevating mechanism used in units 21 is of a type known as "Load-Lift" sold by Lawrence Machine and Manufacturing Company, and need not be described in great detail. Cam scissor link 28 is pivoted at its lower end to mobile carriage 22. Cam scissor link 29 is pivoted at its upper end to elevating frame 27. The two links are pivoted together about a shaft or stud 36. On the same axis another pair of links 28 and 29 is similarly pivoted. Between the two sets of links is located the actuating mechanism including motor 31 and gear box 37 in which are mounted nuts 38 which are threaded on screws 39 anchored in camming head 41. Camming head 41 carries cam rollers 42 which engage especially shaped camming surfaces of camming scissor links 28 and 29. As the motor 31 is turned in one direction, nuts 38 move screws 39 to the right and this moves head 41 and cam rollers 42 to the right allowing the scissor links 28, 29 to close, lowering the elevating frame 27. As the motor 31 is driven in the opposite direction, the nuts 38 drive the screws 39 to the left and this moves cam rollers 42 to the left, spreading apart the scissors' lever 28, 29 and raising the elevating frame 27.

The free ends of the links 28 and 29 are provided with rollers 43, one of these rollers being seen in FIG. 1. These rollers ride on their respective frame members 22 and 27 to maintain the frame member 27 horizontal as it is raised and lowered.

Four vertical jackscrews could be used instead of scissor links. Although the illustrated form of table is preferred, the subject invention may be deemed independent of this choice.

One motor 44 with a gear box 47, drives for each unit 21 a sprocket 46. Motor 44 is reversible and thus drives a chain 48 in either direction to move carriage 22 along the track 23, the carriage being secured to the chain 48 at one point.

Beam-turning mechanism

With reference initially to FIG. 3, the beam-turning mechanism is operated by a jackscrew 51 which is driven by motor 34 through a gear box 52 and a flexible coupling 53. As seen in FIG. 4, jackscrew 51 is provided with a main bearing 54 which can take thrust in either direction, and a supplemental bearing 56.

The jackscrew 51 is threaded through a yoke 57, and moves this yoke 57 back and forth. In the central position of yoke 57, shown in FIGS. 3 and 4, the L frames are all in their idle or normal positions shown in FIG. 1. As the yoke 57 is moved to the right, it actuates L frame 32 leaving L frame 33 idle. As yoke 57 is moved to the left, it actuates L frame 33, leaving L frame 32 idle.

The way in which this selective operation of the L frames is accomplished is best seen in FIG. 7. Here the yoke 57 has been moved to the right by the turning of jackscrew 51. By links 58, it has drawn lever 59 and L frame 32 somewhat counterclockwise from its idle position shown in FIG. 6. Lever 59 is fast on shaft 61. The L frame 32 is also fast on shaft 61 so that turning lever 59 turns L frame 32.

This same rightward movement of yoke 57 from its center position has had no effect on L frame 33 because the actuating linkage for it, comprising links 58′, has merely collapsed.

On the other hand, when yoke 57 moves to the left as seen in FIG. 6, the linkage comprising links 58 collapse, and links 58′ draw lever 59′ to turn shaft 61′ clockwise, thereby actuating L frame 33.

As seen best in FIG. 3, the links 58 and 58′ are double links so as not to exert any cantilever forces on the pins connecting them to the associated parts. FIG. 3 also shows that L frame 32 is narrower than L frame 33, so that the long arms of both L frames may be at the same level in their normal position.

Also shown in FIG. 3 are bearing bushings 63, carried by elevating frame 27, in which shaft 61 is journalled. Bearing bushings 64 similarly carry shaft 61′. These shafts, being rigid with the L members, are parts of the L frames 32 and 33.

Yoke 57 is preferably supported by rollers 66 (seen most clearly in FIGS. 3 and 5) which, as seen in FIGS. 5 and 6 run on track 67. A guide strip 68 lies above the roller 66. As shown in FIG. 4, it is longer than track 67 and ensures that rollers 69, one carried by links 58 and one by links 58′, will buckle downwardly.

Control of operations

All of the mobile elevating and turning units 21 may be jointly and synchronously controlled by a control box 71 seen in FIG. 1. This control box is preferably located adjacent the control console 72 for the beam punch 12. A handle 73, which is preferably different from the other handles to avoid error and because of having more positions, can be moved away from the operator to successive positions to move the carriages 22 at successively greater speeds in that direction, and to successive positions in the opposite direction to move the carriages 22 at successive speeds in the opposite direction. Lever 74 may similarly be pivoted away from or toward the operator to control the up and down movements of all of the elevator frames 21. Lever 76, when moved away from the operator will cause turning of the beam in the clockwise direction (actuation of L frames 33); and when pivoted toward the operator, will cause opposite turning of the beam (actuation of L frames 32).

As indicated in FIG. 8, the powering and control of motors 31 and 34 is extended to them through a cable 77 which is wound on a reel 78 as frame 22 is moved toward the reel 78. There is a cable 77 and a reel 78 for each of the mobile elevating and turning units 21. Each reel 78 is carried by a mounting and connecting unit 79 from which a conduit 81 extends to control box 71. Unit 79 also biases reel 78 for winding cable 77.

On carriage 22 is mounted a junction box 82 to which the cable 77 extends and in which it is connected to the various wires carried by the unit 21. Besides the three wires extending to each reversible motor 31 and 34, there will be two wires extending to the various limit switches 86, 87, 88, and 89. Limit switch 86 is provided with an upstanding button actuated when elevating frame 27 reaches its lowermost position. Limit switch 87 is located approximately as seen in FIG. 1 to be actuated by rollers 43 or associated structure when the elevating frame 27 reaches its uppermost position. Limit switch 88 is located (for example in a manner indicated in FIG. 7) to be actuated by lever 59 (or a special lever for the purpose) when L frame 32 reaches its extreme actuated position. Limit switch 89 is located in similar manner as indicated in FIG. 6 for being actuated when L frame 33 reaches its extreme actuated position.

These various limit switches may control relays in control box 71 or elsewhere. It should be understood, however, that each limit switch controls only the motor of the unit 21 on which it is located. This is important in maintaining synchronized movements of the various units 21. The various motors 31 will all be started substantially simultaneously when lever 74 is actuated, and the various motors 34 will all be started substantially simultaneously when lever 76 is actuated. All of these motors are of reasonably constant speed characteristics. Of course, all of the motors 31 are identical and all of the motors 34 are identical. Accordingly, it is expected that the operations on all of the units 21 will be substantially synchronized. Nevertheless, it is possible for them to get slightly out of synchronization and this can be remedied, and will frequently be remedied without any special attention, by running all like motors until they have all been shut off by their respective limit switches. The parts driven by that motor will then be identically positioned. A centering switch can also be provided for yoke 57 to stop the motor 34 when yoke 57 reaches its centered position. So far, this has not been found necessary, however.

Preferably all of the carriages 22 are driven by the same motor 44 through a common shaft 91 so that synchronization of their movements is absolute.

All of the motors are provided with automatic magnetic brakes to eliminate excessive or varying overrun.

Both runs of chain 48 are supported throughout their length, and are made snug, so that backlash is substantially eliminated.

The spacing table, as in the past, includes power means (not shown) for moving the beams lengthwise when they are properly aligned with the beam punch, under control of console 72.

Achievement

From the foregoing, it is seen that an operator who is in a position to operate console 72 can also, unassisted, turn the beams as desired and place them on the correct roller sets. The operator can also deliver a finished beam to one transfer table and pick from another table a beam to be punched, continuing the operation, without overhead crane assistance, through as many beams as may be preliminarily laid out.

Safety is enhanced because the lowering and turning of the beams can be reliably controlled. The carriages 22 will be moved before any turning operation, to move the upstanding arms of the L frame to be used snugly against the beam. Then after the L frame pivots that arm will be snug under the beam and the beam will not have a chance to crash down on anything.

What we claim is:

1. Beam handling apparatus including a plurality of mobile elevating turning units and means for controlling the plurality of units for operation substantially synchronously; each unit including a power-moved carriage, a powered elevating frame carried thereby, and a pair of oppositely facing and overlapping power-pivoted L frames carried by the elevating frame and adapted for supporting a beam for raising and lowering the beam by the elevating frame and for movement of the beam by the carriage; said L frames being separately operable for turning a beam in either direction from the area of overlap, said L frames being pivotal about axes transverse with respect to the direction of mobility and widely separated to receive a beam with its web horizontally disposed between them; and, when positioned to so receive such beam, each having a vertical arm, and a horizontal arm extending the full distance between the vertical arms to engage and support a beam flange resting against either vertical arm.

2. Beam handling apparatus including a plurality of mobile elevating turning units and means for controlling the plurality of units for operation substantially synchronously; each unit including a carriage mobile along one direction of mobility, a powered elevating frame carried thereby, and a pair of oppositely facing power-pivoted L frames carried by the elevating frame and adapted for supporting a beam for raising and lowering the beam by the elevating frame and for movement of the beam by the carriage; said L frames being separately operable for turning a beam in either direction from the central area, said L frames being pivotal about axes transverse with respect to the direction of mobility and widely separated to receive a beam with its web horizontally disposed between them; and, when positioned to so receive such beam, each having a vertical arm, and a horizontal arm extending the full distance between the vertical arms to engage and support a beam flange resting against either vertical arm.

3. Beam handling apparatus including a plurality of mobile elevating turning units and means for controlling the plurality of units for operation substantially synchronously; each unit including a mobile carriage, a powered elevating frame carried thereby, and a pair of oppositely facing pivoted L frames carried by the elevating frame and separately operable for turning a beam in either direction from the central area; and power means for pivoting the L frames selectively including a single reversible motor, a screw driven by the motor, a movable yoke threadably engaging the screw to be moved lengthwise thereof in either direction from a midpoint, and lost-motion means connecting the yoke to each of the L frames to pivot a first L frame by movement in one direction from the midpoint and the second L frame by movement in the other direction from the midpoint, the lost motion means causing the other L frame in each instance to remain unaffected.

4. Beam handling apparatus including a power operated elevating frame and a pair of oppositely facing pivoted L frames carried by the elevating frame and separately operable for turning a beam in either direction from the central area; and power means for pivoting the L frames selectively including a single reversible motor, a screw driven by the motor, a movable yoke threadably engaging the screw to be moved lengthwise thereof in either direction from a midpoint, and lost-motion means connecting the yoke to each of the L frames to pivot a first L frame by movement in one direction from the midpoint and the second L frame by movement in the other direction from the midpoint, the lost motion means causing the other L frame in each instance to remain unaffected.

5. Beam turning apparatus including a frame, and a pair of oppositely facing pivoted L frames carried by the frame and separately operable for turning a beam in either direction from the central area; and power means for pivoting the L frames selectively including a single reversible motor, a screw driven by the motor, a movable yoke threadably engaging the screw to be moved lengthwise thereof in either direction from a midpoint, and lost-motion means connecting the yoke to each of the L frames to pivot a first L frame by movement in one direction from the midpoint and the second L frame by movement in the other direction from the midpoint, the lost-motion means causing the other L frame in each instance to remain unaffected.

6. Beam turning apparatus including a frame, and a pair of oppositely facing pivoted L frames carried by the frame and separately operable for turning a beam in either direction from the central area; and power means for pivoting the L frames selectively including a movable yoke, power means for moving the yoke in either direction from a mid location, and lost-motion means connecting the yoke to each of the L frames to pivot a first L frame by movement in one direction from the midpoint and the second L frame by movement in the other direction from the midpoint, the lost-motion means causing the other L frame in each instance to remain unaffected.

7. Beam turning apparatus including a frame, and a pair of oppositely facing pivoted L frames carried by the frame and separately operable for turning a beam in either direction from the central area; and power means for pivoting the L frames selectively including a single power means and lost-motion means connecting the power means to each of the L frames to pivot a first L frame by movement in one direction from the midpoint and the second L frame by movement in the other direction from the midpoint, the lost-motion means causing the other L frame in each instance to remain unaffected.

8. A self-loading spacing table for moving beams through a beam punch including spaced sets of web-engaging rollers aligned with the punch and spaced sets of separable flange engaging rollers aligned with the punch, for longitudinal movement of a beam through the punch in three postures: one flange face uppermost, the other flange uppermost, and the web horizontal; and beam handling means interspersed with said roller sets and each including a carriage movable transversely of the beam, a power elevating frame carried by the carriage, and power beam turning means carried by the elevating frame and engaged with the beam merely by moving said carriage and elevating said frame.

9. A self-loading spacing table for moving beams through a beam punch including spaced sets of web-engaging rollers aligned with the punch and spaced sets of separable flange engaging rollers aligned with the punch, for longitudinal movement of a beam through the punch in three postures: one flange face uppermost, the other flange face uppermost, and the web horizontal; and beam handling means interspersed with said roller sets and each including a carriage movable transversely of the beam, a power elevating frame carried by the carriage, and power beam turning means carried by the elevating frame and engaged with the beam merely by moving said carriage and elevating said frame,
said beam turning means including a pair of oppositely facing power-pivoted L frames carried by the elevating frame and separately operable for turning a beam in either direction from the central area, said L frames being pivotal about axes transverse with respect to the direction of mobility and widely separated to receive a beam with its web horizontally disposed between them, and, when positioned to so receive such beam, each having a vertical arm and a horizontal arm extending the full distance between the vertical arms to engage and support a beam flange resting against either vertical arm.

10. Beam handling apparatus including a plurality of mobile elevating turning units and means for controlling the plurality of units for operation substantially synchronously; each unit including a carriage mobile along one direction of mobility, a powered elevating frame, and a beam-carrier elevated and lowered by the elevating frame for raising and lowering the beam and moved by the carriage for moving the beam laterally, and including a pair of oppositely facing power-pivoted L frames separately operable for turning a beam in either direction from the central area, said L frames being pivotal about axes transverse with respect to the direction of mobility and widely separated to receive a beam with its web horizontally disposed between them; and, when positioned to so receive such beam, each having a vertical arm and a horizontal arm extending the full distance between the vertical arms to engage and support a beam flange resting against either vertical arm.

References Cited by the Examiner
UNITED STATES PATENTS

| | | | |
|---|---|---|---|
| 721,626 | 2/1903 | Wellman | 214—1 |
| 2,418,091 | 3/1947 | Pandoff | 214—1 |
| 2,916,164 | 7/1956 | Avery | 214—1 |
| 3,154,298 | 10/1964 | Amadieu | 214—1 |

MARVIN A. CHAMPION, *Primary Examiner.*